United States Patent [19]

Grobel

[11] 4,355,003

[45] Oct. 19, 1982

[54] TWO PASS ENDOTHERMIC GENERATOR

[75] Inventor: Edward W. Grobel, Libertyville, Ill.

[73] Assignee: General Signal Corporation, New York, N.Y.

[21] Appl. No.: 194,895

[22] Filed: Oct. 7, 1980

[51] Int. Cl.³ ............................................. F28D 21/00
[52] U.S. Cl. ......................................... 422/206; 48/74;
48/113; 48/196 A; 110/218; 422/199; 422/202;
422/218
[58] Field of Search ............... 422/199, 202, 206, 218,
422/198; 48/74, 113, 196 A, 196 FM, 197 R,
197 FM; 110/218

[56] References Cited

U.S. PATENT DOCUMENTS

| | | | |
|---|---|---|---|
| 1,943,580 | 1/1934 | Brown | 422/218 X |
| 2,013,652 | 9/1935 | Hall | 422/206 X |
| 2,700,598 | 1/1955 | Odell | 48/196 A |
| 2,806,768 | 9/1957 | Bender et al. | 48/74 X |
| 2,910,350 | 10/1959 | Jean | 422/206 X |
| 3,594,131 | 7/1971 | De Palma et al. | 422/218 |
| 3,607,125 | 9/1971 | Kydd | 48/196 A X |

FOREIGN PATENT DOCUMENTS 310956 3/1930 United Kingdom .
1307845 2/1973 United Kingdom .
1316869 5/1973 United Kingdom .
1596738 8/1981 United Kingdom .

Primary Examiner—Richard L. Chiesa
Attorney, Agent, or Firm—Oblon, Fisher, Spivak, McClelland & Maier

[57] ABSTRACT

A furnace or generator for reacting a hydrocarbon gas which undergoes a reaction having an exothermic phase followed by an endothermic phase, is disclosed. The generator consists of concentric inner and outer tubes having a reacting gas inlet at the top of the inner tube and a reacted gas outlet near the top of the outer tube. The inner tube has holes adjacent its bottom for communicating the bottom of the inner tube with the annular space between the inner tube and the outer tube. The bottom portion of the generator forms a reactor portion while the top portion forms a recuperator portion. A gas air mixture entering near the top of the inner tube is heated in the recuperator portion by the reacted gas in the annular passage. Additional heating means may be provided.

12 Claims, 2 Drawing Figures

TWO PASS ENDOTHERMIC GENERATOR

BACKGROUND OF THE INVENTION

1. Field of the Invention

The present invention relates to furnaces for reacting a gas capable of an exothermic reaction phase followed by an endothermic reaction phase. More particularly, the present invention relates to a furnace for producing a protective atmosphere of 40% $N_2$, 40% $H_2$, and 20% CO (nominally).

2. Description of the Prior Art

Numerous industrial operations require a protective or shielding atmosphere such as a 40% $N_2$, 40% $H_2$, and 20% CO (nominally) atmosphere. These industrial applications include the hardening of medium and high carbon steels, the annealing and normalizing of carbon steels, carburizing carbonitriding, copper and silver brazing and sintering.

It has been known that a protective atmosphere containing a nominally 40% $N_2$, 40% $H_2$, and 20% CO (with residual $CO_2$, $H_2O$ and $CH_4$) could be produced by the cracking of a hydrocarbon gas over a catalyst bed at high temperature. The hydrocarbon gas could include such gases as natural gas, propane, butane, of MFG (manufactured gas). Further, furnaces or generators have been known for carrying out such a cracking process. One such furnace is the HYEN endothermic generator manufactured by the Lindberg Company of Chicago, Ill.

The HYEN endothermic generator is illustrated in FIG. 1. It consists of an elongated tubular metallic housing 2 having a length of from approximately 45 to approximately 69 inches and a diameter of approximately 8 inches. The tube has a closed bottom 4 including a reaction gas inlet 6 and insulation layer 8. The top of the tube is also closed except for reacted gas outlet 10. A reacted gas passage 12 adjacent the top of the tube includes insulation 14.

Screen 16 is supported by the insulation 8 and prevents the catalyst from plugging the gas inlet 6. Over the screen is placed material having good heat transfer characteristics, such as alundum chips 18, while the remainder of the tube is filled with catalyst material. The catalyst material is in the form of porous $\frac{1}{2}''$ to $1''$ cubes or spheres impregnated with nickel oxide.

The furnace is normally located within an insulating jacket (not shown). Heat may be supplied to the furnace by either surrounding the furnace with electric resistance coils (not shown) or by supplying hot combustion gases to the interior of the insulating jacket.

In use, a reaction gas, such as natural gas, is mixed with air in a carburetor and the mixture enters the furnace at the bottom inlet pipe 6. The catalytic cracking of the hydrocarbon gas in the mixture is a two phase reaction; the reaction has a first exothermic phase followed by a subsequent endothermic phase. As the reaction gas mixture enters into the alundum chip bed, it is heated by the heat source until the gas mixture reaches minimum temperature for exothermic combustion to commence (approximately 1170° F.). The heat liberated during the exothermic phase is absorbed by the gas mixture raising its temperature into the endothermic range which commences at approximately 1750° F. During the endothermic phase, heat from the heat source is required to maintain the reaction gas temperature above 1750° F. until the cracking process is completed.

The insulation 14 in the reacted gas passage prevents premature cooling of the reacted gas and the reacted gas product exits at 10 at a temperature of approximately 1700°.

For example, a mixture of one part natural gas to 2.44 parts air was preheated to 200° F., introduced into the HYEN generator and reacted at a rate of 1513 cubic feet per hour (CFH). Heating power was supplied to the generator at the rate of 17.77 kilowatts per hour (KW/HR). The reacted gas exited the generator at 1700° F. with a dew point of 28.8° F., a methane content of 0.46%, a carbon dioxide content of 0.65%, a carbon monoxide content of approximately 20%, a hydrogen content of approximately 40%, and a nitrogen content of 40%.

However, the HYEN endothermic generator described above has several shortcomings. First, it fails to provide a uniformity of gas heating during the reaction process. When the gas first enters the bottom of the catalyst bed 20 this area has been heated by a combination of heat supplied by the heat source and exothermic reaction taking place in the alundum chip bed. As the reaction gas travels up through the catalyst bed, all additional heat needed to continue the endothermic reaction must be supplied by the heat source.

Since this reaction is initially exothermic, heat is created and driven into the center portion of the 8″ diameter furnace retort forcing complete exothermic reaction throughout the first approximately 12″ height of the alundum chip bed and the lower portion of the catalyst bed within the retort. Factually, this area is not entirely exothermic as the dissociation of $H_2O$ (water vapor) and $CO_2$ (carbon dioxide) are endothermic and also occur in this area simultaneously.

Further, because of the relatively large 8″ diameter of the generator retort 2 and the insulating quality of the catalyst bed therein, there is insufficient heat penetration into the center portion of the catalyst bed.

Therefore, a "cold spot" is formed in the center of the generator retort where the temperature is below the desired reaction range, and the gas moving through this cold spot is deprived of heat during the final portion of the travel through the generator retort. As a result, in order to provide sufficient heat so that all of the gas is reacted, it is necessary to raise the heat source temperature gas to approximately 200° to 300° F. higher than the minimum cracking temperature in order to assure that all reacting gas within the generator is above 1750° F., the minimum cracking temperature. The reacted gas entering the insulated area 14 thus ranges in temperature from approximately 1750° F. to 1800° F. and exits the retort at approximately 1700° F.

If a proper reaction does not take place due to insufficient heating to the central core of the catalyst bed, the residual methane ($CH_4$) content can drop out as carbon soot by the reaction $CH_4 \rightarrow C + 2H_2$.

Further, excessive sooting can take place downstream of the reacted gas outlet 10 if cooling is too slow to "freeze" the reverse reaction ($2\ CO \rightarrow C + CO_2$), thereby producing carbon if the temperature drops too slowly through the range of 1250° to 900° F.

Further, it is necessary to provide the reaction gas with a head temperature of 200° F. to 300° F. to assure that a proper reaction takes place which also requires excessive amounts of energy at the furnace heat source.

Further, the need for a 200°–300° F. head temperature requires the need for a higher grade of alloy retort and electric heating element material and furnace refractory insulation resulting in excessive material costs.

Further, since the reacted gas leaving the furnace at approximately 1700° F. temperature enters immediately into a heat exchanger, following the furnace, in order to cool the gas to a useful processing temperature (approximately 150° F.), all the heat within the reacted gas on leaving the catalyst bed, and removed by the heat exchanger ($\Delta T$ 1700° F.$\leftrightarrow$150° F.), is thereby being wasted.

Finally, because of the high temperature involved, more expensive construction material must be used and the life of the material is shortened.

SUMMARY OF THE INVENTION

It is therefore an object of the present invention to provide a generator or furnace for producing a protective atmosphere gas of 40% $N_2$, 40% $H$, 20% CO (nominally) which requires less heating energy than that of the prior art.

It is a further object of the present invention to provide a furnace or generator for a protective atmosphere gas wherein the reacted gas exiting the generator is substantially lower than 1700° F. by releasing some of its energy to preheat the incoming unreacted gas.

It is a further object of the present invention to provide a furnace or generator for a protective atmosphere gas which utilizes the heat from the exothermic portion of the reaction to eliminate the "cold area" in the center of the retort catalyst bed, thereby achieving a more uniformly reacted gas at a lower furnace heat source temperature.

It is a further object of the present invention to produce a two pass furnace or generator for producing a protective atmosphere gas which can also be converted from the prior art generator by a simple retrofit.

Accordingly, the present invention consists of a two pass generator constructed of a pair of concentric tubes. The reaction gas can be introduced at the top of the inner one of the concentric tubes and flows through the tube towards the catalyst bed at the bottom of the tube. After passing through vent holes at the bottom of the inner tube, the reaction gas passes through additional catalyst material and completes the reaction process. The hot reacted gases then pass through the space between the inner and outer tubes before exiting the furnace adjacent the top thereof. The reaction gas initially entering the inner tube is therefore preheated by the already reacted gas which is passing upwardly through the space between the tubes on the other side of the inner tube. Therefore, the excessive heat contained in the exiting gas can be transferred to the entering gas for raising its temperature prior to the exothermic phase of the reaction. As the preheated entry gas passes into the alundum chip bed within the inner tube, it is further heated by the heat from the exothermic phase prior to entering the catalyst bed in the lower portion of the inner tube, commencing the endothermic phase prior to entering the area between the inner and outer retort tubes where the heat required for the endothermic reactions is supplied to the retort by the furnace heat source. Further, because of the higher reacted gas temperature achieved in the inner tube prior to exiting into the area between the inner tube and outer retort wall and the smaller cross section of the catalyst bed in this "doughnut" shaped area a more uniform and penetrating heat from the furnace heat source reduces the temperature gradient in the outer catalyst bed area thereby reducing the "head" temperature of the furnace heat source while maintaining a uniform temperature for the endothermic reaction.

The reacted gas is finally passed back through the upper recuperator portion in the passage between the inner and outer tubes and exits the generator. Because it is not necessary to avoid a "cold spot" as in the prior art, the maximum temperature within the generator or furnace can be kept down to approximately 1800°. Further, because the recuperator permits the recovery of a portion of the heat, the exit temperature is approximately 1300° F., thereby requiring a $\Delta T$ from 1300° to 150° F. in the downstream heat exchanger which facilitates a much more rapid chilling through the reverse reaction range of 1250° F. to 900° F. while recuperating the heat in the $\Delta T$ from 1700° F. to 1300° F. within the retort.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
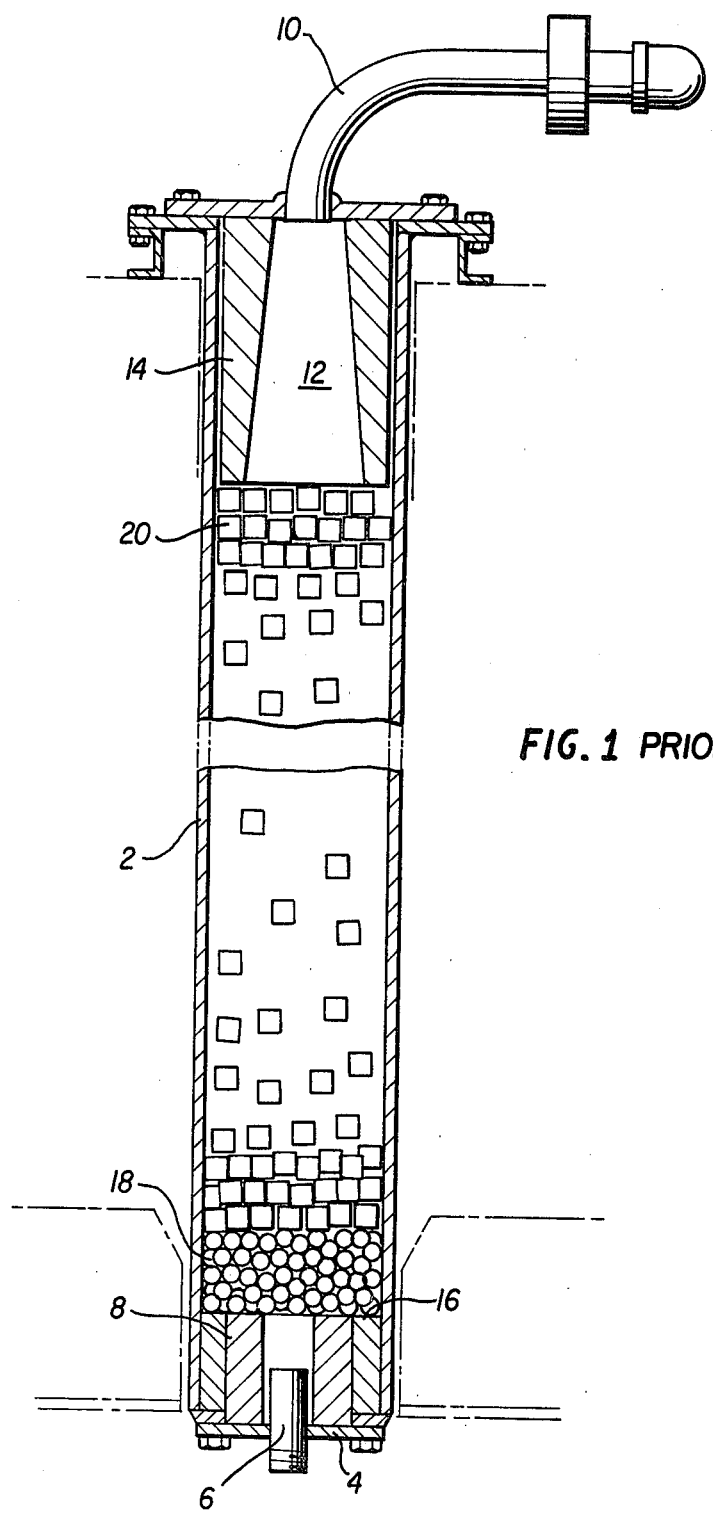
FIG. 1 is a cross sectional view of a prior art generator.
Figure 2:
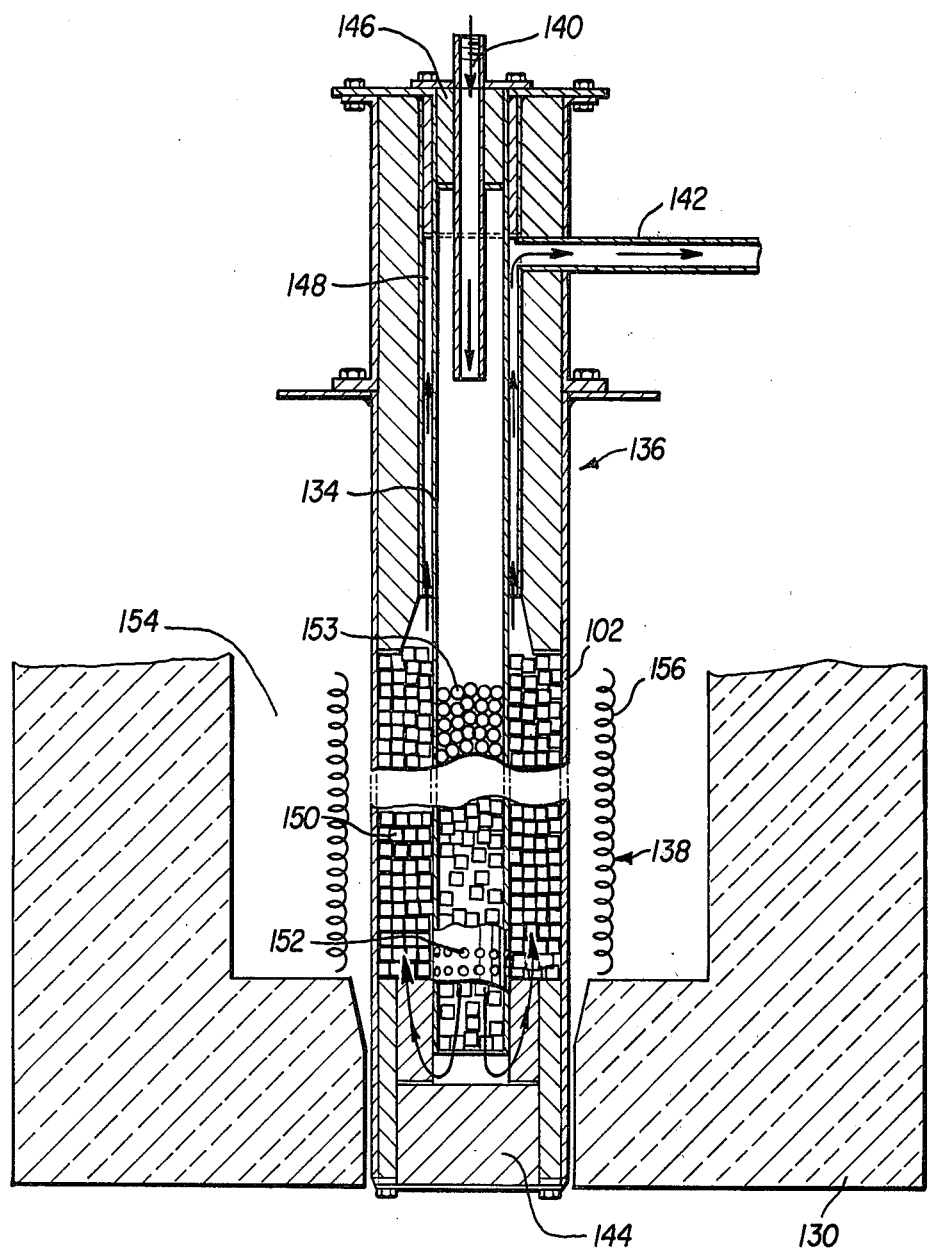
FIG. 2 is a cross sectional view of the generator of the present invention.

The generator of the present invention is shown in FIG. 2. The generator consists of an outer tube 102 which may be identical to the outer tube 2 of the prior art. The outer tube is held within an insulation jacket 130 and is supported within the jacket at flanges 132. An inner tube 134 lies concentrically within the outer tube 102, thereby defining an elongated "doughnut" or annular space between the tubes. The annular space, as well as the space within the inner tube, are divided into a recuperator portion 136 adjacent the top of the generator, and a reactor portion 138 in the lower section of the generator. The reactor portion preferably constitutes ⅔ of the length of the generator.

A reaction gas inlet is formed as an inlet pipe 140 extending concentrically into the inner pipe from the top thereof. A reacted gas outlet 142 extends transversely from the annular space to the outside of the generator adjacent the top thereof.

The inner and outer tubes are preferably formed of a heat resistant metallic alloy.

The bottom, top and side walls of the generator are lined with insulating material, as is the top plug 146. Further, the annular space in the recuperator portion is also lined with insulating material to thereby leave a relatively narrow annular space 148 between the wall of the inner tube and the insulating material on the inner wall of the outer tube at the recuperator portion.

Both the lower portion of the inner tube and the annular space within the reactor portion are filled with a bed of catalyst material 150. The catalyst material may be of any type which will promote an endothermic reaction of the introduced gases, but preferably consists of porous brick impregnated with $NiN_2$ and fired to form $N_iO$. The brick is preferably in the form of stacked 11/16 inch cubes, but other sizes or shapes are possible. Vent holes 152 in the walls of the inner tube adjacent the bottom thereof, permit the passage of reacting gas from the catalyst bed within the inner tube to the catalyst bed within the annular space. The precise number and diameter of the holes depends upon the flow rate of gas through the generator and should be selected so that the back pressure within the inner tube is not excessive. A bed of alundum chips 153 is positioned above the catalyst 150 within the inner tube.

Heat can be provided to the space 154 between the insulating jacket and the outer tube by either gas combustion (not shown) or electric resistance heaters 156.

In use, a hydrocarbon gas such as natural gas, propane, butane, or MFG. gas is mixed with air and is introduced into the reaction gas inlet pipe 140. As the reaction gas passes downwardly through the recuperator portion of the inner tube, it absorbs heat from the wall of the inner tube 134 which has been heated by the reacted gas passing upwardly through the annular passage 148. Because of the relatively small diameter (3 inches) of the inner tube, the surface friction effects of the inner tube are relatively large which causes turbulence within the pipe and mixing of the gas within the pipe so that the temperature across the diameter of the inner pipe is relatively uniform. Further, because of the relatively small diameter of the inner pipe, heat need only penetrate approximately an inch and a half in order to heat the gas within the pipe to combustion temperature. When the preheated gas reaches the top of the alundum chip bed 153 within the inner pipe, its temperature is raised even further by the heat generated from the exothermal reaction occurring within this area. Again, because of the relatively small diameter of the inner tube, heating along the length of the exothermic area of this tube is relatively uniform and the minimum temperature at any point in the tube is not substantially under the minimum temperature needed for the endothermic reaction in the annular space outside this tube.

As the reaction continues, the reacted gas passes through the vent holes 152 and into the annular space between the tubes. The reaction moves from the exothermal phase to the endothermal phase at approximately the same time that the gas passes through the vent holes.

As the reacting gas passes upward through the annular space between the tubes, the endothermal reaction absorbs the heat necessary for this reaction which is provided by the external heat source, through the metallic walls of the outer tube. The reacted gas then passes upward through passage 148 and transfers additional heat to the incoming gas within the inner tube in the recuperator portion. The insulation within the recuperator portion prevents the heat from the reacted gas from being transferred outside of the generator.

The cooled, reacted gas exits the generator at outlet pipe 142 at a temperature of about 1300°–1400° F. The outlet has has, therefore, been rapidly cooled to just above the reverse reaction temperature range (900°–1250° F.), thus making the freezing reaction in the heat exchanger an easier task thereby limiting the production of soot in the reverse reaction range when using only an air heat exchanger.

Because of the relatively even heating across the annular doughnut shaped endothermic reaction area, the maximum temperature within the generator can be held at close to the 1750° F. temperature necessary for the reaction to take place; that is, around 1800° F. Because the maximum temperature is thus about 150° F. less than that required in the prior art, less expensive construction material may be used and the input of outside heat can be decreased. Further, the lower reacted gas outlet temperature, in addition to reducing the soot output of the generator, eliminates the need for an expensive water cooled heat exchanger between the generator and an air cooled heat exchanger.

EXAMPLE 1

A mixture of one part natural gas to 2.42 parts air was introduced into the generator of the present invention. A heating power of 11.87 kilowatts per hour was used to raise the gas to a control temperature of 1800° F. The output gas had a volume of 1514 cubic feet per hour, a methane content of 0.44%, a dew point of 20° F., a carbon dioxide content of 0.24%, a nitrogen content of 40%, a hydrogen content of 39%, and a carbon monoxide content of 20%.

EXAMPLE 2

Natural gas and air at a ratio of one part gas to 2.47 parts air was introduced into the generator of the present invention and a heating power of 11.87 kilowatts per hour was introduced to raise the control temperature of 1800° F. The output volume of 1506 cubic feet per hour had a methane content of 0.32%, a dew point of 30.8° F. and a carbon dioxide percentage of 0.33% + $N_2$, $H_2$ and CO.

It can therefore be seen that, due to the lower control temperature and the use of a recuperator, that the generator of the present invention utilizes significantly less energy that that of the prior art. Further, even if the temperature is raised to 1950° F., as in the prior art, there is still an energy savings as illustrated by the Example below.

EXAMPLE 3

Natural gas and air were mixed at a ratio of 1 to 2.41 and introduced into the generator of the present invention. A heating power of 16.41 kilowatts per hour was used to raise the control temperature to 1950° F. The output gas had a volume of 1517 cubic feet per hour, a methane content of 0.5%, a dew point of 22° F. and a carbon dioxide content of 0.57%. A heating power of 1.36 kilowatts per hour was, therefore, saved even using a 1950° F. control temperature.

The prior art HYEN generator can be easily retrofit to produce the generator of the present invention. It is merely necessary to remove the top and bottom plugs and catalyst from the prior art generator. The outer shell and insulation jacket need not be modified, except for the positioning of the gas outlet pipe 142. The inner tube 134 and catalyst bed may then be easily introduced for a relatively simple retrofit.

Obviously, numerous modifications and variations of the present invention are possible in light of the above teachings. It is therefore to be understood that within the scope of the appended claims, the invention may be practiced otherwise than as spceficially described herein.

What is claimed as new and desired to be secured by Letters Patent of the United States is:

1. An apparatus for carrying out a reaction having an initial exothermic phase and a subsequent endothermic phase, said apparatus comprising:
   a first conduit having a top and bottom, an upper recuperator portion, a lower reactor portion, a reaction product outlet means in said recuperator portion;

a second conduit within said first conduit, said second conduit being coaxial with said first conduit and having a diameter less than that of said first conduit by an amount sufficient to create an annular space between said conduits, said second conduit extending from adjacent said top of said first conduit through at least a portion of said lower reactor portion, said second conduit having reaction gas inlet means and means in said reactor portion for communicating the interior of said second conduit with said annular space;

a catalyst bed in at least a portion of said reactor portion; and heating means surrounding only the reactor portion of said first conduit.

2. The apparatus of claim 1 wherein said catalyst bed fills that portion of said inner conduit and that portion of said annular space which lie in said reactor portion.

3. The apparatus of claim 1 or 2 wherein said reactor portion comprises the lower portions of said first and second conduits.

4. The apparatus of claim 1 or 2 wherein said catalyst bed comprises cubes composed of porous brick impregnated with $NiN_2$ fired to form NiO.

5. The apparatus of claim 1 wherein said means for communicating comprises a plurality of vent holes in said second conduit.

6. The apparatus of claim 1 wherein said conduits comprise metallic alloy tubes.

7. The apparatus of claim 1 or 6 including heating means adjacent said reactor portion.

8. The apparatus of claim 1 wherein said heating means comprise electric resistance heating means.

9. The apparatus of claim 1 wherein said heating means comprise gas heating means.

10. The apparatus of claim 1 wherein said reaction gas inlet means comprises a third conduit in said second conduit and coaxial therewith.

11. The apparatus of claim 1 including insulation between said first conduit and said annular space, said insulation extending only through said recuperator portion and on the bottom of said first conduit.

12. A two pass furnace for carrying out a reaction having an initial exothermic phase and a subsequent endothermic phase, said furnace comprising:

an elongated metallic outer tube having a closed top and bottom, an upper recuperator portion and a lower reactor portion;

an elongated metallic inner tube having a closed top and bottom and extending coaxial with said outer tube from the top of said outer tube to adjacent the bottom thereof, said inner tube forming an elongated annular space between said inner tube and said outer tube;

insulating material at the bottom of said outer tube and in said recuperator portion between said annular space and said outer tube;

catalyst material forming a catalyst bed in said reactor portion, said catalyst material comprising cubes composed of Ni impregnated porous brick;

a reaction gas inlet tube coaxially extending into the top of said inner tube;

vent holes adjacent the bottom of said inner tube for permitting said reaction gas to pass into said annular space;

a reacted gas outlet extending from adjacent the top of said annular space; and heating means surrounding said outer tube adjacent said reactor portion, whereby the heat from said heating means and said exothermic phase heat said reaction gas in said endothermic phase.

* * * * *